United States Patent
Benckenstein, Jr. et al.

(10) Patent No.: US 7,279,867 B2
(45) Date of Patent: *Oct. 9, 2007

(54) METHOD FOR BALANCING CELLS OR GROUPS OF CELLS IN A BATTERY PACK

(75) Inventors: Claude Leonard Benckenstein, Jr., Sugar Land, TX (US); David Allen White, Houston, TX (US)

(73) Assignee: Southwest Electronic Energy Corporation, Stafford, TX (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/293,432

(22) Filed: Dec. 2, 2005

(65) Prior Publication Data

US 2007/0126399 A1 Jun. 7, 2007

(51) Int. Cl.
H02J 7/00 (2006.01)

(52) U.S. Cl. .................. 320/119; 320/112; 320/116

(58) Field of Classification Search ................ 320/119, 320/112, 116
See application file for complete search history.

(56) References Cited

U.S. PATENT DOCUMENTS

| | | | |
|---|---|---|---|
| 4,851,756 A | 7/1989 | Schaller | 320/3 |
| 5,461,264 A | 10/1995 | Yang | 307/81 |
| 5,619,417 A | 4/1997 | Kendall | 364/483 |
| 5,736,833 A | 4/1998 | Farris | 320/21 |
| 5,900,717 A | 5/1999 | Lee | 320/150 |
| 6,037,750 A | 3/2000 | Von Novak | 320/132 |
| 6,291,972 B1 * | 9/2001 | Zhang | 320/118 |
| 6,437,539 B2 | 8/2002 | Olsson | 320/118 |
| 6,844,703 B2 | 1/2005 | Canter | 320/131 |
| 6,873,134 B2 * | 3/2005 | Canter et al. | 320/118 |

OTHER PUBLICATIONS

Crowell, POwer Controller Managing Array of Smart Batery Pack, Dec. 15, 2005, US 2005/0275372.*

* cited by examiner

Primary Examiner—Karl Easthom
Assistant Examiner—Yalkew Fantu
(74) Attorney, Agent, or Firm—Buskop Law Group PC; Wendy Buskop

(57) ABSTRACT

A method for balancing cells or groups of cells connected in parallel and in series for a battery pack by providing a continuously balanced state of charge while in a discharge phase, a charge phase, a quiescent phase, a storage phase, or combinations of these phases.

5 Claims, 6 Drawing Sheets

METHOD FOR BALANCING CELLS OR GROUPS OF CELLS IN A BATTERY PACK

FIELD

The present embodiments relate to a method for balancing a plurality of cells or groups of cells connected in series and in parallel to form a battery pack system for use in various applications such as, transportation, communication, oil and mineral exploration, oceanographic research and monitoring, pipeline monitoring and maintenance, various medical applications, and various portable applications including military applications.

BACKGROUND

Lithium ion battery technology is becoming the standard for rechargeable energy storage systems. Lithium ion batteries are able to store up to three to four times as much electric energy as currently used rechargeable batteries.

However, current lithium ion battery pack balancing technology has the disadvantage that it requires complex and costly electronic control and balancing circuitry that may be inactive for long periods of time.

Currently, balancing the capacities of series connected lithium ion cells in a battery pack system is accomplished using resistors connected by switches across each cell combined with cell voltage monitoring and computer control. The resistors dissipate a relatively small amount of power and are activated infrequently. Large battery packs with multiple sources of differential leakage currents cause the battery pack capacity to diminish and not be available for rapid use at all times.

Current battery pack balancing technology is not able to balance group of cells connected in parallel and then series which have been inactive for long periods of time.

A need exists for a method for balancing various types of battery packs and cells using continuously active control circuitry regardless of the state of the battery pack.

The present embodiments address these needs.

BRIEF DESCRIPTION OF THE DRAWINGS

The detailed description will be better understood in conjunction with the accompanying drawings as follows.

Figure 1:
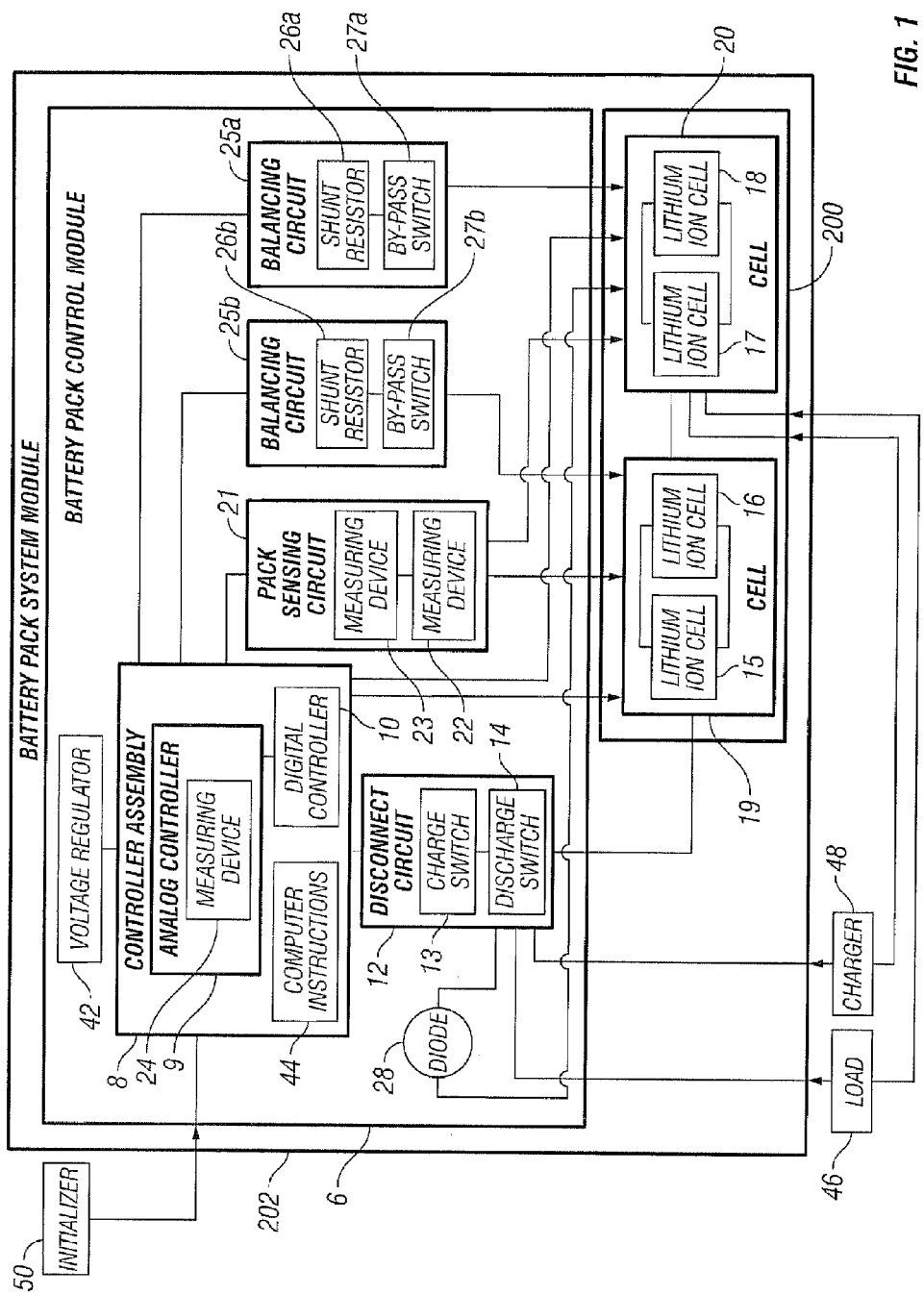
FIG. 1 depicts a battery pack system module usable in a method of the invention for balancing cells of a battery pack using a reverse voltage protection diode.

The present embodiments are detailed below with reference to the listed Figures.

DETAILED DESCRIPTION OF THE EMBODIMENTS

Before explaining the embodiments in detail, it is to be understood that the embodiments are not limited to the particular description, and that they can be practiced or carried out in various ways.

Cell balancing incorporated with protection circuits have only been available for 4 series lithium ion cells. Traditionally, balancing is only accomplished during charge phase. The embodiments address cell balancing in any one of four states, which include quiescent, charge, discharge and storage.

The present embodiments are generally related to a method for balancing a plurality of cells connected together in parallel and then the cells connected in parallel form groups that can connect in series.

The present embodiments can extend the power duration of battery packs of lithium ion cells to create high energy per ounce battery packs with a longer life in comparison to lead acid or other rechargeable batteries. Lithium ion cells and lithium ion battery packs are highly desirable as a source of power because of their high energy capacity, low weight, small size, and potential for long life. The present embodiments should also work with various types of battery systems.

The present embodiment enables lithium ion battery pack systems to be balanced at all times or continuously balanced, thereby extending the life cycle of the lithium ion cells or groups of lithium ion cells. The present embodiments should enable the balancing of other types of battery systems. The present embodied method enables minimal loss of capacity of the battery pack system while providing a light weight, continuously balanced battery pack.

The present embodiments cause improved power duration for balanced lithium ion cells or groups of lithium ion cells connected in series, or connected in parallel and in series.

The present embodiments can monitor and measure parameters for a plurality of lithium ion cells connected in parallel or groups of lithium ion cells connected in parallel and in series. The present embodiments can be used to determine the relative state of charge for individual lithium ion cells connected in parallel or for groups of lithium ion cells connected in parallel and in series.

The present embodiments provide a method to balance battery pack systems at all times, continuously. The method can be used when the battery cells are in a discharge phase, a charge phase, a quiescent phase, storage, or combinations of these conditions.

After measuring and monitoring, the method can remove portions of a state of charge for at least one of the individual cells connected in parallel or at least one of the groups of cells connected in parallel then in series, if the cell or groups of cells exceed a preset limit.

With reference to the figures, the method can be understood with regard to the apparatus and software usable to implement the exemplary embodiments of the method.

FIG. 1 depicts a battery pack control module 6 with protective circuitry that includes a reverse voltage protection diode 28. The reverse voltage protection diode 28 connects to a disconnect circuit 12, as well as a group of cells connected in parallel 20 in the implementation of an embodiment of the method.

The battery pack control module 6 includes a controller assembly 8 connected to the disconnect circuit 12. The controller assembly 8 can execute instructions to engage or disengage the disconnect circuit 12. The controller assembly 8 can communicate with the voltage regulator 42, a monitor or initializer 50, a balancing circuit 25a and 25b, and a pack sensing circuit 21.

In the method, monitoring and measuring of cell voltage, temperature, and current is performed. To implement the method, FIG. 1 shows an exemplary device for measuring cell voltage 24 usable within the controller assembly 8. The controller assembly 8 can connect to the series connected groups of cells connected in parallel 19 and 20.

If a device for measuring cell voltage 24 is used in the method, but the device is connected outside of the controller assembly 8, then the pack sensing circuit 21 can connect directly to the series connected groups of cells connected in parallel 19 and 20, and the controller assembly 8 does not have to connect directly to the series connected groups of cells connected in parallel 19 and 20.

The method contemplates a step for preventing excessive voltage from crossing the controller assembly. To implement this method, FIG. 1 depicts a reverse voltage protection diode 28 for preventing excessive voltage from developing across the controller assembly 8, the voltage regulator 42, and the disconnect circuit 12.

The method contemplates that the controller assembly 8 can include an analog controller 9 and a digital controller 10 to implement computer instructions 44 when temperature, voltage, and current exceed preset limits which are obtained from a configuration table with statistics that are saved in memory of a processor of the digital controller 10 in optional data storage, not shown in FIG. 1.

Exemplary analog controllers usable with the method are those available from Texas Instruments of Dallas, Tex., Part Number BQ29312A.

An exemplary digital controller 10 can be circuitry that includes one or more analog I/O ports, one or more digital I/O ports, a processor, which could be a microprocessor, memory which can be a flash memory and processing logic located in the memory, as well as additional computer instructions in the memory for directing the processor to perform discharge of current functions when one or more measured values for temperature, current or voltage exceed or drop below a preset limit from a configuration table.

The method contemplates that the digital controller can include at least one configuration table. The configuration table can be a table, groups of tables, or can be programmable data about the cells to be balanced. Additional data storage can be used in communication with the processor for storing the configuration table, as well as storing computer instructions for operating the circuitry of the balancing circuit and for storing additional data related to the configuration table. The data storage can include the monitored and measured data obtained by the battery pack control module, such as cell voltage, current and/or temperature. The monitored and measured data of the method can be recorded and stored in database format or a table format.

The method contemplates the use of a disconnect circuit 12 with a charge switch 13 and a discharge switch 14 which can be connected in series.

The charge switch 13 can be a transistor switch such as a Vishay P-FET switch of Malvern, Pa. The discharge switch can be the same part as the charge switch or a similar type of switch.

A lithium ion cell 15 can be connected in parallel to a lithium ion cell 16. A lithium ion cell 17 can be connected in parallel to a lithium ion cell 18. A plurality of lithium ion cells 19 connected in parallel can be connected in series to a plurality of lithium ion cells connected in parallel 20. A group of parallel-connected lithium ion cells can be connected as groups in series 200.

The method contemplates using balancing circuits 25a and 25b each having a shunt resistor, depicted as elements 26a and 26b respectively, and each having a bypass switch depicted as elements 27a and 27b respectively to facilitate the balancing step after monitoring and measuring and then comparing is completed.

In a preferred embodiment, the method contemplates using a shunt resistor across groups of cells connected in series through the bypass switch.

The method contemplates using a pack sensing circuit 21 that connects to the controller assembly 8 and the groups of cells connected in series 19 and 20. The pack sensing circuit 21 can include various sensors, measuring means and monitoring means. The pack sensing circuit 21 can be used to measure any combination of cell voltages in groups of cells in series. The pack sensing circuit 21 can also be used to measure temperatures of a cell, temperatures of groups of cells, or temperatures between groups of cells. The pack sensing circuit 21 also has a device for measuring cell voltages 24 between cells, between groups of cells or combinations thereof. One or more current measuring, cell voltage measuring and/or temperature measuring devices can be used in the embodied method.

An embodiment of the method contemplates that the device for measuring cell voltages 24 between cells, between groups of cells or combinations thereof, can be internal to the analog controller 9. The means for measuring cell voltages can be within the analog portion of the controller assembly 8. An example of a device usable for measuring cell voltages could be a Texas Instrument analog controller that additionally measures voltage, which is available from Texas Instruments of Dallas, Tex.

The pack sensing circuit 21 can include a device for measuring battery pack temperature 22, which can be external to the controller assembly 8. This temperature sensing device can be any thermistor such as those from CTS of Elkhart, Ind.

Additionally, an embodiment of the method contemplates that the pack sensing circuit 21 of FIG. 1 can include a device for measuring battery pack current 23, which can be external to the controller assembly 8. The device for measuring battery pack current can be a resistor, such as those available from Vishay of Malvern, Pa.

The method contemplates using balancing circuits 25a and 25b that can include shunt resistors 26a and 26b connected to by-pass switches 27a and 27b. The by-pass switch 27a or 27b can be a semiconductor switch, a variable resistor, a mini-micro switch or combinations of these devices. The balancing circuits 25a and 26b can be used to connect between the plurality of cells 15, 16, 17, 18 or between the groups of parallel connected cells 19 and 20 which can be connected in series 200. The controller assembly 8 can activate balancing activity by engaging or controlling the balancing circuits 25a and 25b.

The present embodiments can include computer instructions 44 that can be used with the controller assembly 8 to direct the controller assembly 8 to activate disconnect circuit 12 to disconnect cells from a load 46 or a charger 48 and thereby enhancing the balancing of the groups in series 200, and for battery pack system module 202 safety.

The computer instructions 44 can be stored in the memory of a processor of a computer or server usable in the embodiments, which can include instructions to initialize and control the analog controller 9 for battery pack system module 202 safety and to enable or disable individual balancing circuits 25a and 25b at anytime, to keep groups of cells in series 200 continuously in balance.

In addition, the method contemplates using a battery pack control module 6 with a voltage regulator 42 for powering the controller assembly 8. The voltage regulator 42 can be a DC programmable voltage regulator such as those made by Linear Technology, Inc. of Malpitas, Calif.

The embodied method contemplates that a monitor or initializer 50 can be connected to the controller assembly 8, such as the type made by Hewlett Packard of Palo Alto, Calif.

A load 46, which is also referred to herein as an application, can be connected to a battery pack system module 202. A charger 48 can be connected to the battery pack system module 202. In FIG. 1, a line is depicted around battery pack control module 6 with the plurality of cells connected in parallel, further connected in series 200, which is hereafter termed "a battery pack system module 202."

Figure 2:
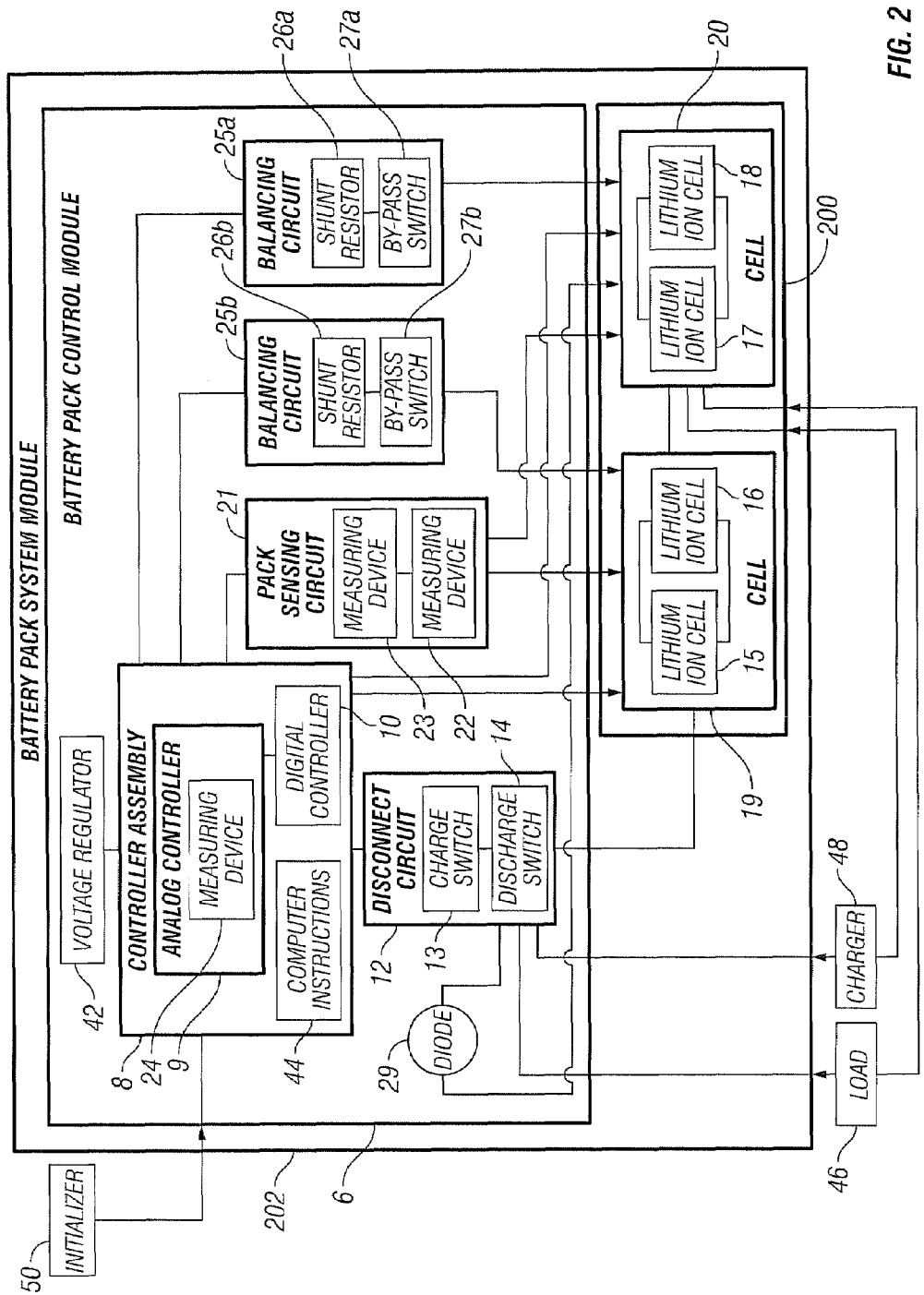
FIG. 2 depicts a battery pack system module usable in a method of the invention for balancing cells using a bypass diode.

FIG. 2 depicts an alternative embodiment to that shown in FIG. 1. In FIG. 2, a bypass diode 29 can be utilized instead of a reverse voltage protection diode 28. Bypass diodes are available from ON Semiconductor of Phoenix, Ariz., and Vichay of Malvern, Pa.

Figure 3:
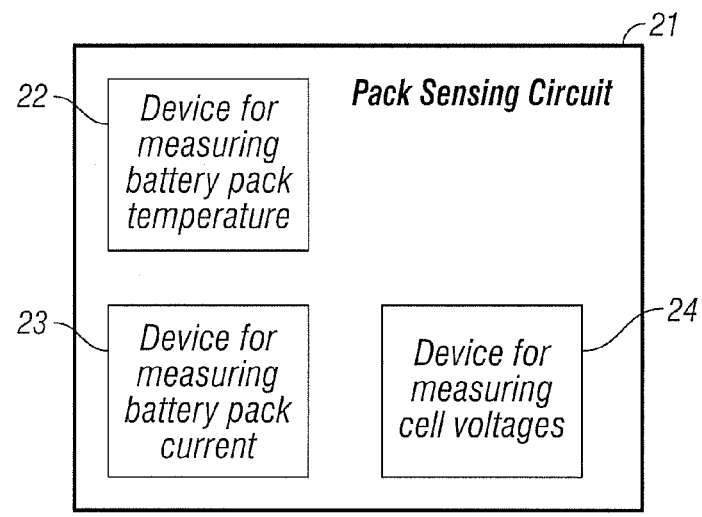
FIG. 3 depicts a pack sensing circuit usable in a method of the invention.

FIG. 3 provides a detailed view of the pack sensing circuit 21 usable in the embodied method. The pack sensing circuit 21 of FIG. 3 can include a device for measuring battery pack temperature 22, a device for measuring battery pack current 23, and a device for measuring cell voltages 24, or combinations thereof.

Figure 4:
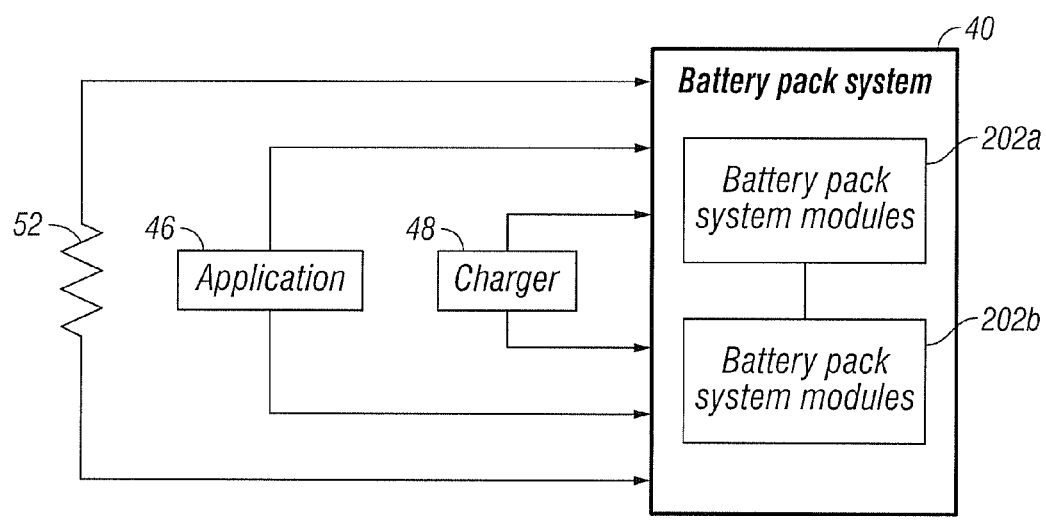
FIG. 4 depicts a battery pack system usable in an embodiment of a method of the invention with battery pack modules connected in series.

FIG. 4 depicts a detailed view of a battery pack system 40 which can be operated by the embodied method. The battery pack system 40 depicts a plurality of at least two battery pack system modules shown connected in series as elements 202a and 202b to form a battery pack system 40. The battery pack system modules 202a and 202b typically have the same number of groups of cells connected in parallel but need not contain the same number of these parallel groups connected in series. The plurality of cells or groups of cells are lithium ion cells, such as those sold through Southwest Electronic Energy Corporation of Houston, Tex.

FIG. 4 shows an application 46 connected to the battery pack system 40 and a charger 48 also connected to the battery pack system 40.

A discharge resistor 52 is depicted connected to the battery pack system 40. Discharge resistors are available from Vishay of Malvern, Pa.

The embodiments contemplate balancing the state of charge of at least two battery pack system modules connected in series 202a and 202b by discharging the battery pack system 40 using a discharge resistor 52 until a balanced state is achieved. The bypass diode 29 shown in FIG. 2 that is contained within each battery pack system modules 202a, 202b facilitate the balancing of these two series connected battery pack system modules.

The battery pack system modules 202a and 202b are contemplated to be available for use anytime, even if the battery pack system 40 has been in an idle state, a discharge state, a quiescence state or in storage, which can be long term storage. The battery pack system modules 202a and 202b can be individually available for use at full capacity any time due to the internal balancing circuit shown in FIG. 1 and FIG. 2. Alternatively, if the battery pack system 40 contains battery pack system modules 202a and 202b that are not balanced, the battery pack system 40 will require the discharge balancing described above before the battery pack system 40 is available at full capacity.

Figure 5A:
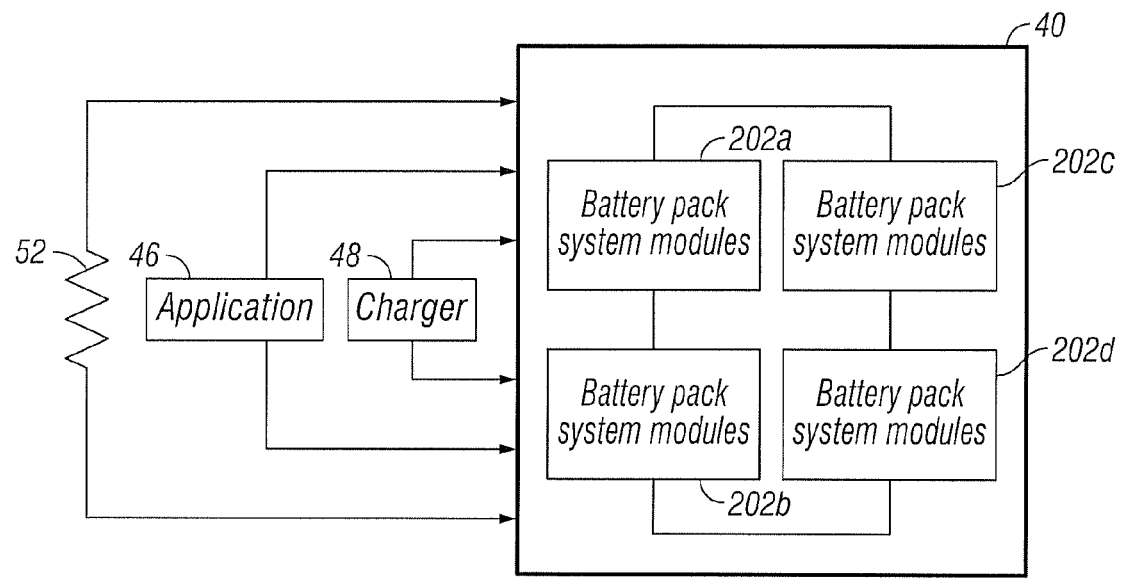
FIG. 5 depicts battery pack system containing battery pack system modules connected both in parallel and in series usable in an embodiment of the invention.
Figure 5B:
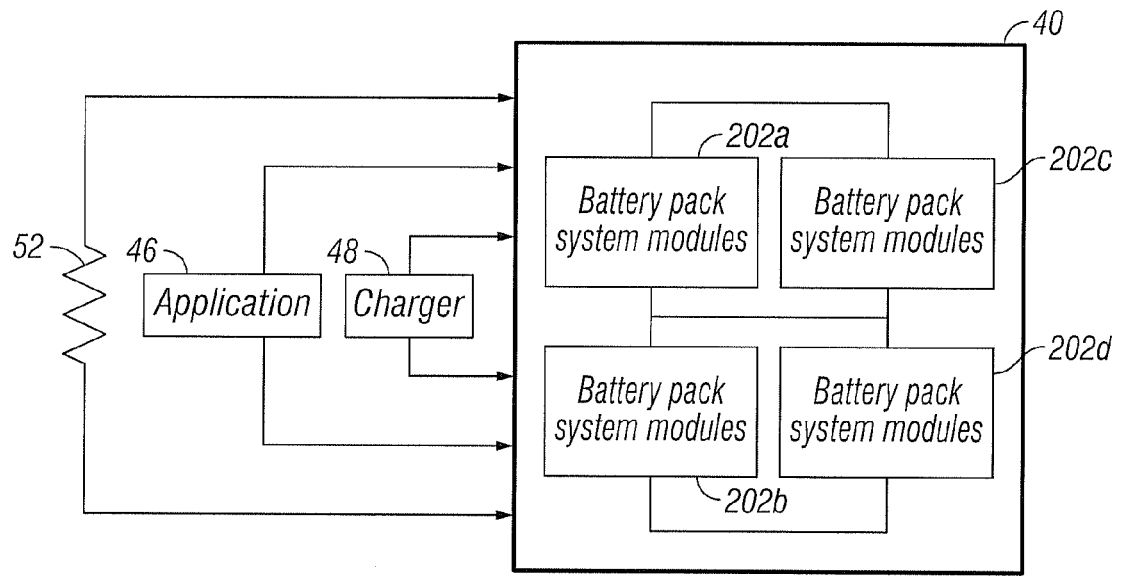

FIG. 5 depicts a plurality of battery pack systems containing at least two battery pack system modules that are connected both in parallel and in series 202a, 202b, 202c, and 202d.

Figure 6:
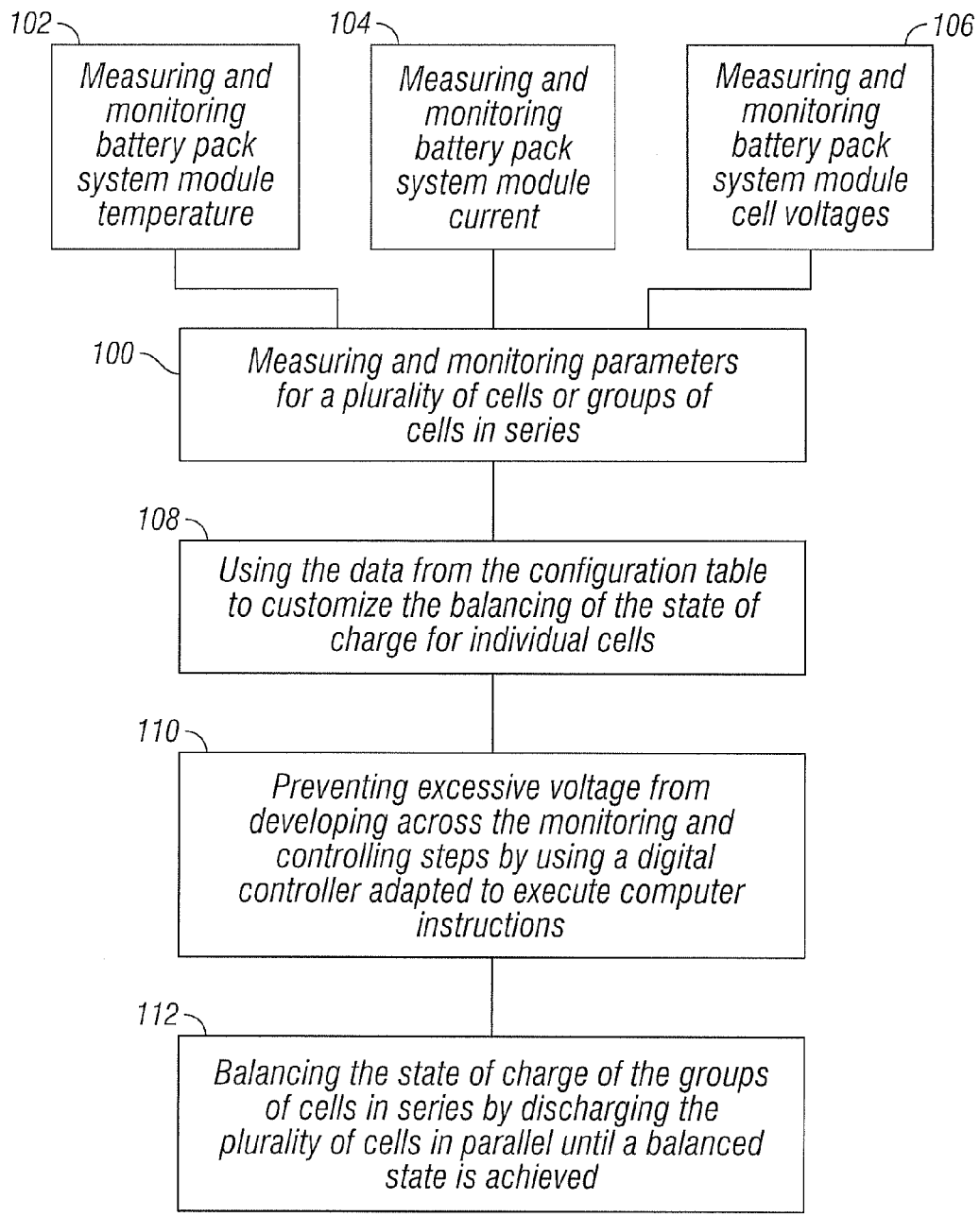
FIG. 6 depicts a sequence of steps for an embodiment of a method used to balance the battery pack system module depicted in FIG. 1

FIG. 6 depicts a sequence of steps used to balance the battery pack system module of FIG. 1.

The method involves monitoring and measuring parameters for a plurality of cells or groups of cells connected in parallel and in series to determine a state of charge for individual cells 100.

The method of step 100 can include the step of monitoring and measuring the temperature of lithium ion cells or groups of lithium ion cells 102, the step of monitoring and measuring the current of the lithium ion cells or groups of lithium ion cells 104, and the step of monitoring and measuring cell voltages for lithium ion cells or groups of lithium ion cells 106.

The monitoring and measuring is performed using a sensing circuit. The circuit includes thermistors, comparitors, resistors, voltage translators and similar components for sensing temperature, voltage and current. The measured data is stored in the digital controller previously noted in FIG. 1.

The next steps involve using data from a configuration table to customize the balancing system for the cells or groups of cells to which the balancing system is connected, the groups of cells, shown in FIG. 1. The step for using the data is indicated as step 108.

An example of the step of using a configuration table can be using a database stored in data storage connected to a processor or using a database stored in memory of a processor which contains the specifications of the cells or groups of cells connected to the battery pack system module. An example of the specifications usable in the configuration table would be Sanyo specifications which describe a particular group of Sanyo cells used in the groups of cells in series.

The specifications can include data such as the capacity ranges of the cells, the temperature limits of the cells, or the range of currents of the cells or another limit of the cell, such as voltages ranges that the cell can be charged between or discharged between. Other data that can be included in the configuration table can be specifications on the load or application to which the battery pack is to be applied, one or more methods for charging the battery pack, the environment for battery pack operation, and maximum application limits.

The method can be used to control excessive current across the cells. The method can be used to make sure the voltage across the cells is within optimum ranges, therefore not excessively high or low. The method can be used to control excessive temperatures across the cells connected in series, insuring that the temperatures are not too high or too low. The method contemplates that the pack can be opened if the temperature is too high, Additionally, the method contemplates steps which provide data to a user interface, such as a graphics user interface (GUI) which indicates that the temperature across the cells or groups of cells is too high and permits user intervention. This step is depicted as element 110. If a GUI is used, the GUI can display multiple parameters, such as temperature, voltage, current, and computed data (for example, capacity, time to empty, time to full, balance status, and the like). These example parameters can be captured or calculated at a future time and most are Smart Battery (SMB) parameters.

Element 112 is the step of balancing the state of charge of groups of cells in series by discharging the groups of cells in series or plurality of cells of cells in parallel until a balanced state is achieved. As shown in FIG. 1, a balancing circuit 25 is used with a shunt resistor and a bypass switch to facilitate the balancing.

The method can be used to achieve a balanced state of charge for the plurality of cells or groups of cells while in a discharge phase, a charge phase, a quiescent phase, and in storage.

Figure 7:
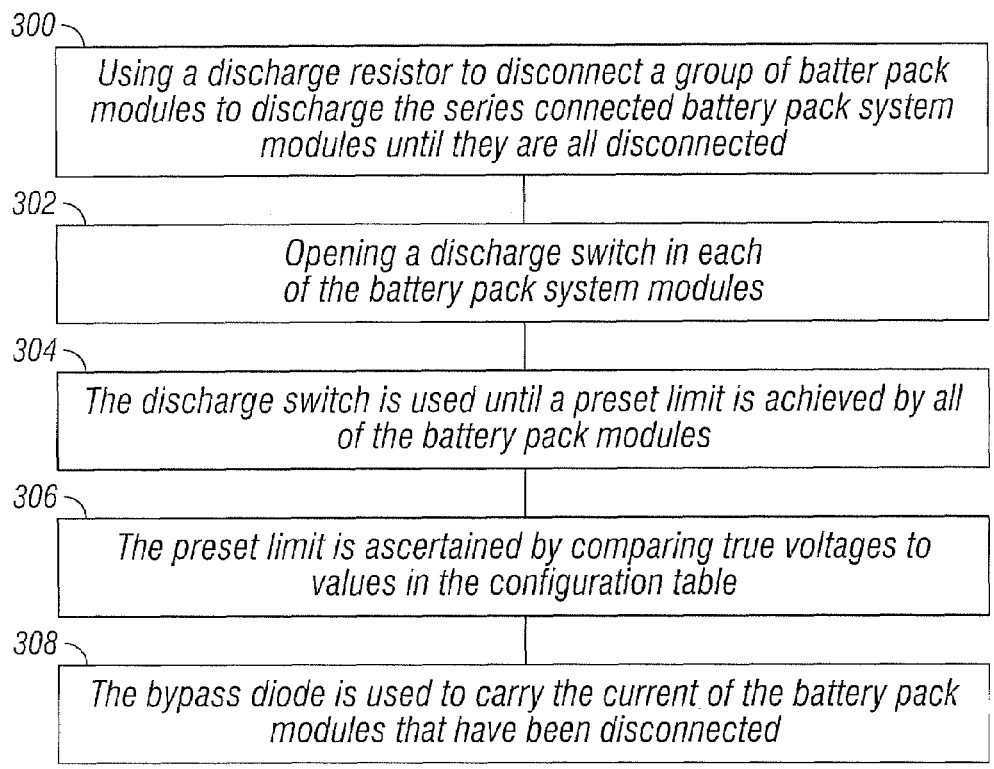
FIG. 7 depict a sequence of steps for an embodiment of a method used to balance the battery pack system depicted in FIG. 4.

FIG. 7 depicts another sequence of steps used to balance a battery pack system.

In FIG. 7, the first step is to use a discharge resistor to disconnect a group of battery pack modules to discharge the series connected battery pack system modules until they all disconnect 300.

The method contemplates a sequence of steps wherein the battery pack modules are maintained in a protect stage. Each of the battery pack modules opens up by opening a discharge switch in each of the battery pack system modules 302. The discharge switch can be used until a preset limit is achieved by all of the battery pack modules 304.

The preset limit can be ascertained by comparing true voltages to values in the configuration table 306, which are the values for achieving a balanced state. The bypass diode shown in FIG. 2 can be used to carry the current of the battery pack modules that have been disconnected 308.

Figure 8:
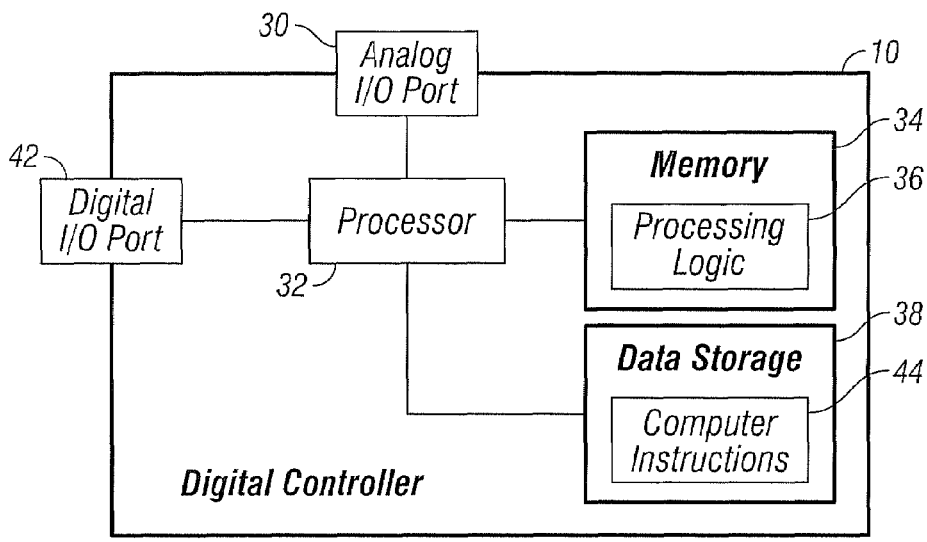
FIG. 8 depicts a digital controller usable in implementing an embodiment of a method of the invention.

FIG. 8 shows an embodiment of a digital controller 10, which can include one or more analog I/O ports 30, one or more digital I/O ports 42, a processor 32, and memory 34 with processing logic 36, and computer instructions 44 within data storage 38, or alternatively within memory 34 for directing the processor 32. The digital controller 10 can include at least one configuration table that optionally, can be a programmable table, adapted for storage in memory or data storage. Data storage 38 can be in communication with the processor 32 for storing the computer instructions 44.

The digital controller can be used to execute computer instructions which can monitor and measure the state of charge for the plurality of lithium ion cells or groups of lithium ion cells; monitor and measure current through the plurality of lithium ion cells, monitor and measure temperature of the plurality of lithium ion cells, monitor, initialize, and activate the analog controller, activate at least one disconnect circuit for safety between the plurality of lithium ion cells or groups of lithium ion cells; and activate at least one balancing circuit to achieve balance between the plurality of lithium ion cells or groups of lithium ion cells.

The digital controller is used to execute computer instructions for monitoring the state of charge of the lithium ion cells or groups of cells and removing at least a portion of the charge to achieve balance between the plurality of cells or group of cells.

The method can include the step 206 of using the digital controller to execute computer instructions for monitoring the state of charge of the lithium cells or groups of cells and removing at least a portion of the charge to achieve balance between the plurality of cells or groups of cells.

While these embodiments have been described with emphasis on the embodiments, it can be understood that within the scope of the appended claims, the embodiments might be practiced other than as specifically described herein.

What is claimed is:

1. A method for balancing a battery pack having a plurality of individual cells or groups of individual cells connected in series, or connected in parallel and then in series, the method comprising the steps of:
   a. monitoring and measuring parameters for a plurality of individual cells connected in parallel or groups of individual cells connected in parallel and then some of the plurality or groups are connected in series, to determine a state of charge for the individual cells connected in parallel or the individual groups of cells connected in parallel and then in series wherein the monitoring and measuring step further comprises measuring a temperature of the cells or the groups of cells;

measuring current of the cells or the groups of cells; and measuring cell voltages of the cells or the groups of cells, and b. removing at least a portion of a charge from the plurality of individual cells connected in parallel or groups of individual cells connected in parallel and then in series to achieve a balanced state of charge for the plurality of individual cells or groups of individual cells while in a discharge phase, a charge phase, a quiescent phase, and a storage phase, further comprising using a digital controller to execute computer instructions to balance the cells, wherein the computer instructions instruct a processor connected to the plurality of cells or groups of cells to execute the steps comprising:

monitoring and measuring the state of charge for the plurality of cells or groups of cells;

activating at least one disconnect circuit between the plurality of cells or groups of cells; when the monitoring and measuring values extend beyond preset limits; and activating at least one balancing circuit to manage the removal of at least a portion of a charge from the plurality of cells or groups of cells to achieve balance.

2. The method of claim 1, further comprising the step of using a configuration table to customize the balancing of the state of charge for the individual cells or groups of individual cells, or combinations thereof.

3. The method of claim 1, further comprising the step of connecting the plurality or individual cells or groups of individual cells together in series to form at least one battery pack system.

4. The method of claim 1, further comprising the step of preventing excessive voltage from developing across the individual cell or groups of individual cells.

5. The method of claim 1, wherein the step of removing a portion of the charge For at least one individual cell or at least one group of individual cells until the balance state uses a disconnect circuit and a diode.

* * * * *